May 31, 1955  F. W. W. MORLEY ET AL  2,709,338
DOUBLE-WALLED DUCTING FOR CONVEYING HOT GAS
WITH MEANS TO INTERCONNECT THE WALLS
Filed Jan. 11, 1954  3 Sheets-Sheet 1
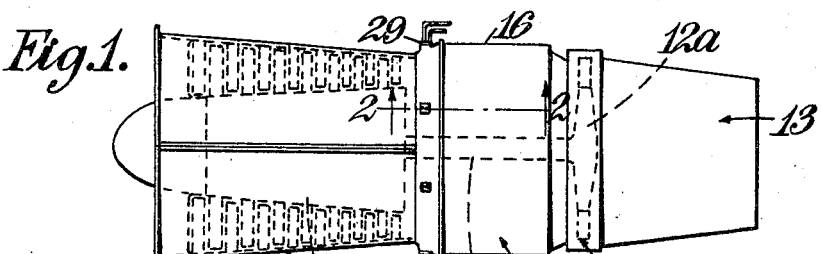
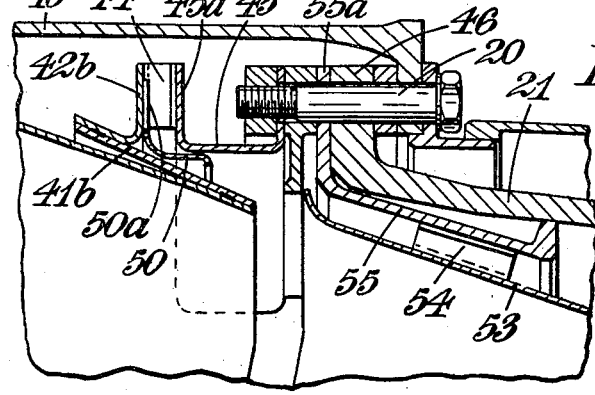
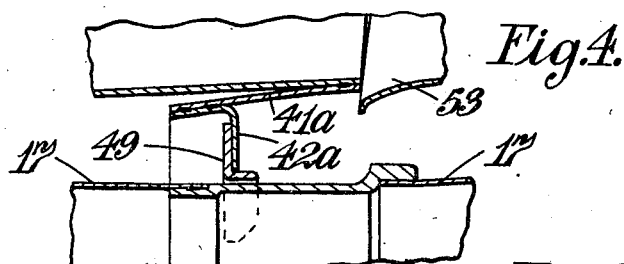
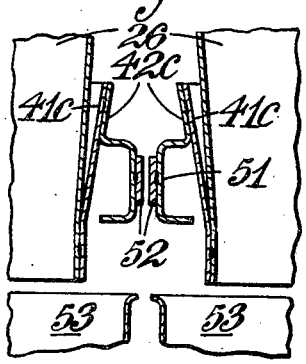 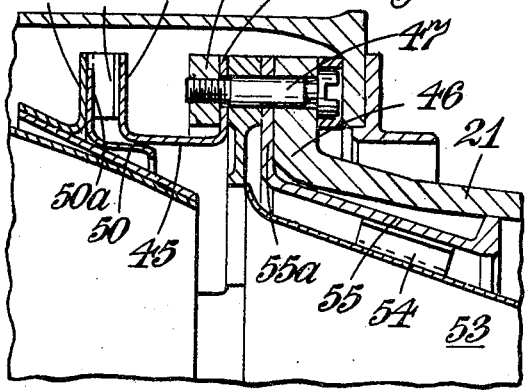
INVENTORS
F. W. W. MORLEY &
B. H. URMSTON
by Wilkinson Mawhinney
Attorneys

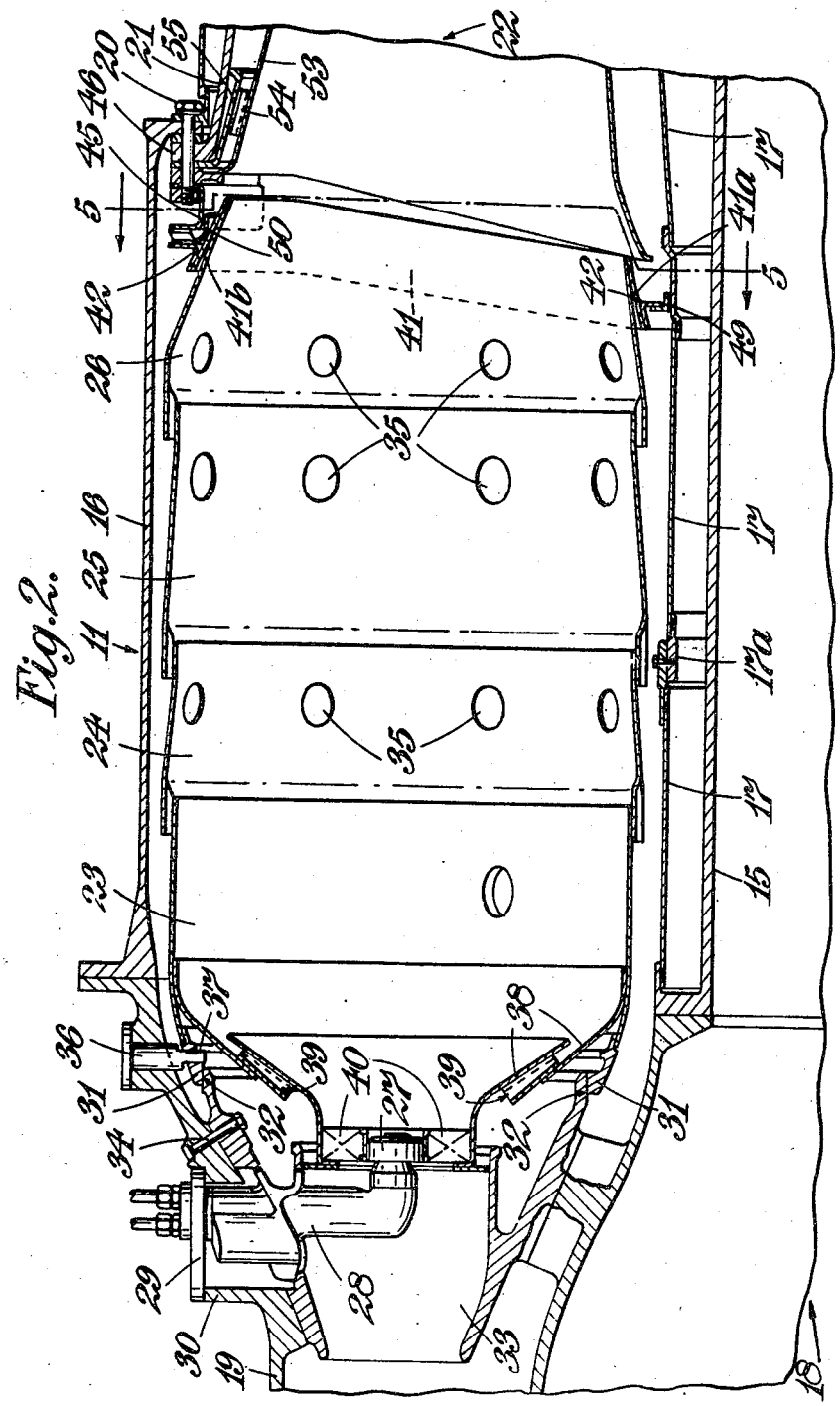

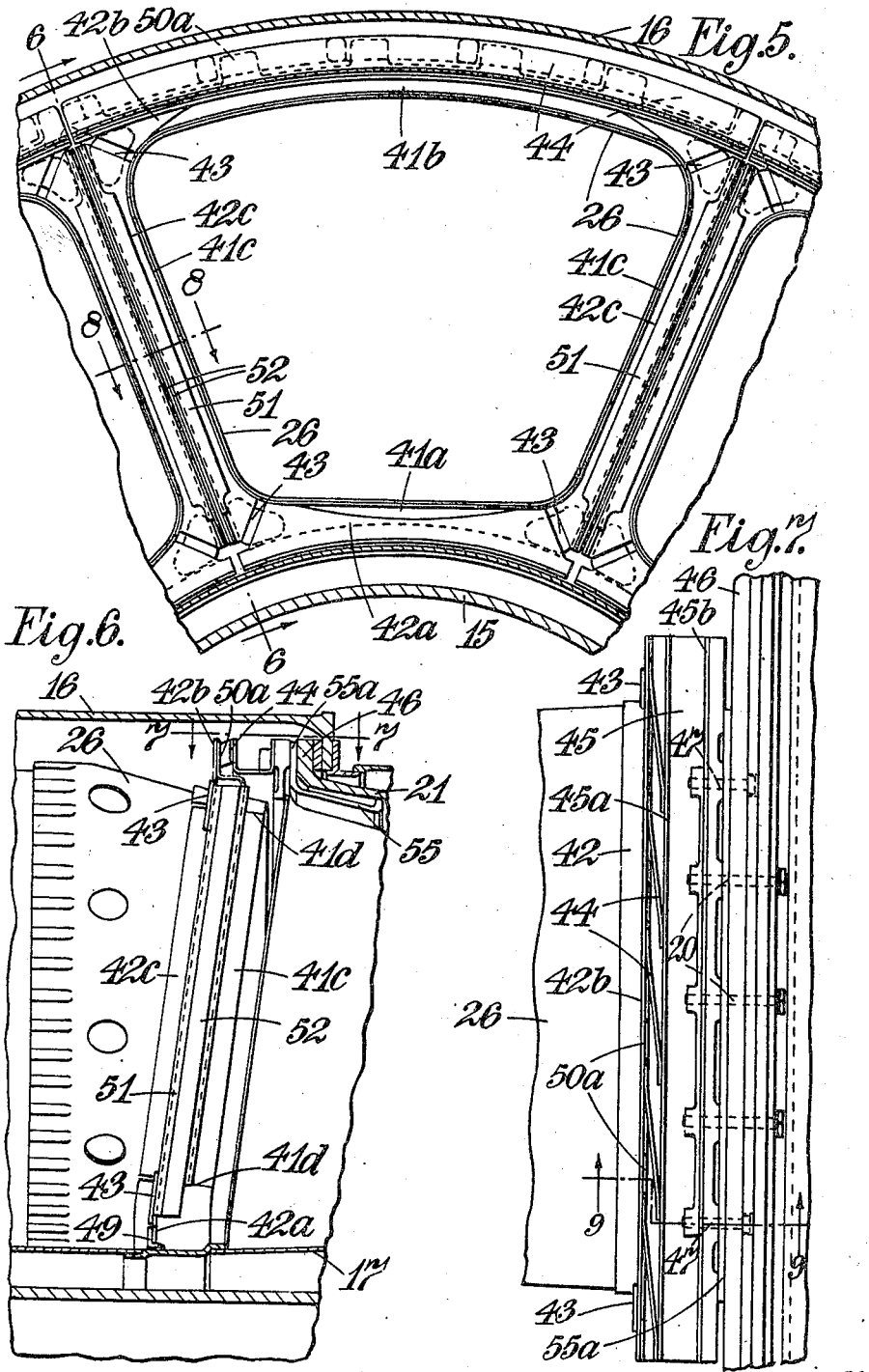

United States Patent Office

2,709,338
Patented May 31, 1955

2,709,338

DOUBLE-WALLED DUCTING FOR CONVEYING HOT GAS WITH MEANS TO INTERCONNECT THE WALLS

Frederick William Walton Morley, Castle Donington, and Bertram Harry Urmston, Kingsway, Derby, England, assignors to Rolls-Royce Limited, Derby, England, a British company Application January 11, 1954, Serial No. 403,314

Claims priority, application Great Britain January 16, 1953

10 Claims. (Cl. 60—39.32)

This invention relates to hot-gas-conveying ducting, one example of which is found in combustion equipment of gas-turbine engines, through which equipment compressed air passes at high rates of mass flow and in which equipment fuel is burnt to heat the compressed air.

Such ducting often comprises an inner wall or casing in contact with the hot gas and an outer wall or casing from which the inner wall or casing is supported. Thus in combustion equipment of gas-turbine engines there is often provided an air casing and within the air casing one or more flame tubes, the combustion of fuel occurring within the flame tube or flame tubes, and a flow of cooling air occurring in the space or spaces outside the flame tube or flame tubes, between them and the air casing.

This invention is concerned with improved means for supporting such inner walls or casings from such outer walls or casings whilst allowing the walls or casings to expand relative to one another.

According to the present invention, in hot-gas-conveying ducting comprising a tubular inner duct wall or casing member and an outer duct wall or casing member, which members are spaced apart, there is provided connection means for mounting said inner member from said outer member comprising a first connector piece which is secured to the inner member at a first location axially of the ducting and is adapted to be capable of relative movement at right angles to the ducting axis with respect to the inner member at a second location axially of the ducting, and a second connector piece which is secured to the first connector piece at said second location, is secured to the outer member, and is adapted to permit relative axial displacement of said first connector piece and the outer member.

With the arrangement of this invention, the provision of a joint between the inner and outer members having relatively slidable parts to accommodate relative expansion is avoided and moreover the arrangement of this invention enables the inner member and outer member to expand and contract relative to one another not only axially of the ducting but also in all directions radial to the ducting axis.

According to a feature of this invention, there is preferably provided a plurality of said second connector pieces between said first connector piece and the outer member, said second connector pieces being spaced apart peripherally of the members. In one preferred construction in which the outer duct wall is circular, each of said second connector pieces comprises a strap element extending circumferentially and axially from the first connector piece to the outer member, and each strap element is welded at one end to a peripheral flange on the first connector piece and at its other end to one flange of a channel member, the other flange of the channel member being bolted to the outer member.

According to another feature of this invention, the first connector piece may comprise a peripherally-extending strip welded to the inner member adjacent a first edge of the strip and diverging from the inner member so that its other edge is spaced from the inner member. In one preferred arrangement according to this feature of the invention, the strip is welded to the inner member adjacent its downstream edge and diverges at an angle of about 5° to the inner member towards its upstream edge and the strip extends around the whole periphery of the inner tubular member in the form of a muff. The muff may have welded to it adjacent its upstream edge a flanged frame member and the second connector piece or pieces are in this case welded to a flange of the frame member.

In applying the invention to combustion equipment having a series of flame tubes disposed in an annular air space, each flame tube is located axially of the flame tube at its upstream end or between its ends and is secured to the air casing structure at its downstream end by means of said first and second connector pieces. Preferably, the muff arrangement is employed with the encircling frame structure, and the straps or the like forming the positive connection are secured at one end to the frame member along its side adjacent the air casing structure, and at the other end to a part rigid with the air casing structure.

There will now be described in detail one construction of combustion equipment for a gas-turbine engine in which a hot-gas-conveying part is supported from outer structure in accordance with the invention. The description makes reference to the accompanying drawings in which—

Figure 1 is a diagrammatic illustration of the engine,

Figure 2 is a longitudinal section on the line 2—2 of Figure 1 through the centre-line of one of the flame tubes of the engine, in a radial plane passing through and on one side of the engine axis, Figure 3 is a view to a larger scale of part of Figure 2, Figure 4 is a view to a larger scale of a second part of Figure 2, Figure 5 is a section on the line 5—5 of Figure 2, Figure 6 is a section on the line 6—6 of Figure 5, Figure 7 is a section on the line 7—7 of Figure 6, Figure 8 is a section on the line 8—8 of Figure 5 drawn to the scale of Figures 3 and 4, and Figure 9 is a section on the line 9—9 of Figure 7 drawn to the same scale as Figures 3, 4 and 8.

Referring to Figure 1, the gas-turbine engine is shown as comprising an axial-flow compressor 10 wherein air is compressed, annular type combustion equipment 11 receiving compressed air from the compressor and having fuel delivered thereto to be burnt in the air, a turbine 12 which receives hot gas from the combustion equipment 11, and an exhaust cone 13 receiving the exhaust gases from the turbine 12.

The annular type combustion equipment extends axially of the engine from the outlet of a compressor 10 to the inlet of a turbine 12.

The combustion equipment encircles a shaft 14 interconnecting the turbine rotor 12a with the compressor rotor 10a and comprises an air casing afforded by an inner wall 15 surrounding the shaft and carrying a number of shield sections so as to protect the wall 15 from excessive heating, the shield sections telescoping to facilitate inspection of the engine parts within the wall 15 and being secured on assembly by a setscrew 17a, and an outer wall 16 radially spaced from the inner wall. The outer wall 16 at its upstream end is bolted to the outer wall 19 of an expansion chamber section 18 provided at the inlet end of the combustion equipment 11. The outer wall 16 extends axially towards the turbine 12 and is connected by bolts 20 at its downstream end to an outer casing 21 of a nozzle box structure 22 through which hot gases are fed to the turbine 12.

The combustion equipment 11 also comprises a plurality of flame tubes which are constructed as described below and are disposed within the annular space between the inner wall 15 and outer wall 16 of the air casing with their axes circumferentially spaced and substantially parallel to the axis of the engine. The combustion equipment is thus of the type generally known as tubo-annular.

Each flame tube is conveniently made in a number of sheet metal sections 23, 24, 25, 26 which are connected together by welding together fluted overlapping portions. The outlet section 26 of the flame tube is of convergent form in the direction of flow through it and has a cross-section (Figure 5) at right angles to the axis of the flame tube which is substantially a segment of a circular annulus so that the outlets from the series of flame tubes form a substantially continuous annular outlet.

Each flame tube is fed with fuel at its upstream end through a fuel injector 27 carried at the end of a strut 28 projecting through an aperture in the wall 19 of the expansion chamber 18. The strut 28 has a flange 29 at its outer end by which it is bolted to a seating 30 on the wall 19.

The inlet end section 23 of the flame tube has a ring 31 secured on it to slide on a cylindrical seating 32 on a snout piece 33 which is secured by bolts 34 to the wall 19 and provides an inlet duct for the primary combustion air entering the flame tube. The remainder of the air flows outside the sections 23, 24, 25, 26 and the greater part of this air enters the flame tube through apertures 35 in the sections 24, 25, 26, and through the passages between overlapping portions of the sections. Moreover each flame tube is located at its upstream end by means of a peg 36 which extends from the outer wall 19 of the expansion chamber 18 into a socket 37 provided in the ring 31. The inlet section 23 of the flame tube is provided internally with a two-piece flare 38 providing air inlets 39, and supporting a swirl vane assembly 40 into which the injector 27 fits.

The outlet section 26 of each flame tube is connected with the air casing walls 16, 17 and nozzle box structure 22 in the following way.

The outlet section 26 (Figures 2, 3 and 9) has a strip of metal secured to it as by welding to form a muff member 41 which is in contact with the external surface of the outlet section 26 only adjacent its downstream edge and which extends forwardly from the downstream edge. It is arranged that the outlet section 26 of the flame tube and its muff 41 are spaced apart upstream of the joint between them and conveniently the muff member diverges from the wall of the outlet section 26 at an angle of about 5°. It will be appreciated that the muff member 41, like the outlet section 26, has generally the form of a segment of a circular annulus and comprises (see Figure 5) a circumferentially-extending inner wall portion 41a an outer wall portion 41b and a pair of radially-extending wall portions 41c interconnecting the circumferentially-extending wall portions 41a, 41b. The strip of metal may conveniently be made in four such portions and butt-welded together, as indicated at 41d (Figure 6), the divergent upstream parts of the muff not being joined, in order to allow flexibility of the respective portions.

Each of the four wall portions of the muff member 41 has secured to it as by welding and adjacent its upstream edge a corresponding portion 42a, 42b, 42c of a frame member 42 and the four portions of the frame member are connected together at their ends by corner plates 43 welded thereto.

The outer circumferentially-extending portion 42b (Figure 3) of the frame member 42 is of acute angle section and arranged so that one flange thereof extends substantially in a plane at right angles to the flame tube axis, the other flange lying alongside and being secured to the muff member 41. The first-mentioned flange has secured to it in circumferentially-spaced relation one end of each of a number (say five) of strap elements 44 (Figure 7), the other ends being welded at angularly-spaced locations to a radial flange 45a of an arcuate channel member 45. The two flanges to which the strap elements 44 are secured are in parallel planes and spaced axially apart and thus each strap element 44 extends circumferentially and slightly axially from the frame member 42 to the channel member 45.

The channel member 45 is secured by its other radial flange 45b (see Figure 9) to a flange 46, formed on the outer casing 21 of the nozzle box structure 22, by set-screws 47 which engage with tapped holes in a tapping plate 48 welded to the radial flange 45b of the channel member 45. The bolts 20 (Figure 3) which secure the outer wall 16 of the air casing to the nozzle box structure 22 conveniently also engage with further tapped holes in the tapping plate 48.

It will be appreciated that the arrangement of strap elements 44 whilst positively securing the outlet section 26 of the flame tube to the nozzle box structure 22 and air casing wall 16 permits relative axial expansion of these parts. Moreover, the muff member 41 by being secured to the outlet section 26 at one axial location and to the frame member 42 at a second axial location and by diverging from the outlet section 26 between these locations, accommodates expansion of the flame tube relative to the air casing and nozzle box structure in all directions at right angles to the flame tube axis. In addition, the arrangement of strap elements 44 affords a positive lateral location of the frame member 42 relative to the air casing wall 16, preventing the bodily displacement of the flame tube transversely relative to the wall 16.

The inner circumferentially-extending portion 42a of the frame member 42 is also of angle section and arranged so that one flange extends substantially at right angles to the flame tube axis and the other lies alongside and is secured to the muff member 41, and the first-mentioned flange carries an arcuate angle-section strip 49 (Figures 2 and 4) which co-operates with slight clearance with one of the shield sections 17 around the inner wall 15 of the air casing to form a gas seal to prevent an excessive flow of air from the space between the flame tubes and the inner wall 15 of the air casing into the nozzle box structure 22.

The outer circumferentially-extending portion 42b of the frame member also carries an arcuate angle-section strip 50, by means of upstanding tabs 50a, (Figures 3, 5, 7 and 9) and this sealing strip may co-operate with the base portion of the channel member 45 thereby to close off the spaces between the strap elements 44 and prevent excessive air flow from the space between the flame tube and the outer wall 16 of the air casing into the nozzle box structure 22.

Each of the radially-extending portions 42c (Figure 8) of the frame member 42 comprises a strip welded to the muff member 41 and having a channel-section flange 51 extending along one edge of the strip, one side of the channel extending substantially at right angles to the flame tube axis, and the base of the channel being substantially parallel to the axis, projecting towards the adjacent flame tube, and carrying an adjusting strip 52 which is machined to give a desired clearance from the corresponding strip 52 of the adjacent flame tube.

The corner plates 43 are welded to the flanges of the portions 42a, 42b, 42c which are substantially at right angles to the flame tube axis.

With the arrangement of this invention, relative axial expansion and relative expansion radially of the flame tube axis is not accommodated as has usually been the case heretofore by relative movement of contacting parts such as tongues or locating pads on one part, which slidingly engage a surface on a second part and the construction of the invention therefore has the advantage that frettage of the parts accommodating relative expansion is avoided.

The nozzle box structure 22 may be of any convenient form and is shown as containing a plurality of sheet metal nozzles 53, one for each of the flame tubes to receive hot gases therefrom. The nozzles are supported from the outer casing 21 of the structure by circumferentially-extending straps 54 which are welded each at one end to the external surface of the corresponding nozzle 53 and at its other end to an arcuate flanged member 55. The members 55 are secured by flanges 55a to the air casing wall 16 and the outer casing 21 of the nozzle box structure 22, the bolts 20 and setscrews 47 being used for this purpose.

The muff member 41 has been described as extending substantially continuously around the periphery of the flame tube, but it will be apparent that instead there may be a number of separate pieces spaced apart around the periphery.

We claim:

1. Hot-gas-conveying ducting comprising a tubular inner duct wall or casing member and an outer duct wall or casing member, which members are spaced apart, and connection means for mounting said inner member from said outer member comprising a first connector piece which is secured to the inner member at a first location, extends round part at least of the periphery of the inner member and is adapted to be capable of relative movement at right angles to the ducting axis with respect to the inner member at a second location, and a plurality of second connector pieces which are secured to the first connector piece at said second location, are secured to the outer member, are spaced apart peripherally of the members and are adapted to permit relative axial displacement of said first connector piece and the outer member.

2. Hot-gas-conveying ducting as claimed in claim 1, wherein the outer member is circular and each second connector piece comprises a strap element extending circumferentially and axially from the first connector piece to the outer member, the strap element being secured by its ends to said first connector piece and to the outer member respectively.

3. Hot-gas-conveying ducting as claimed in claim 2, wherein the first connector piece comprises a peripheral flange, and wherein there is provided a channel member having a pair of flanges, each strap element being welded at one end to the peripheral flange and at its other end to one of said flanges of the channel member, the other flange of the channel member being bolted to the outer member.

4. Hot-gas-conveying ducting as claimed in claim 1, wherein said first connector piece comprises a peripherally-extending strip welded to the inner duct wall or casing member adjacent a first edge of the strip and diverging from said inner member so that its other edge is spaced from the inner member.

5. Hot-gas-conveying ducting as claimed in claim 4 wherein the strip is welded to the inner member adjacent its downstream edge and extends around the whole periphery of the inner member in the form of a muff.

6. Hot-gas-conveying ducting as claimed in claim 4, comprising an angle piece welded to said strip adjacent its said other edge to afford a flange extending towards the outer member the second connector pieces being welded to the flange.

7. Hot-gas-conveying ducting as claimed in claim 1, wherein said inner member is a flame tube of gas-turbine engine combustion equipment and the outer member is an air casing wall of the combustion equipment, and wherein the flame tube is located at one end with respect to the air casing and is joined to the air casing wall through said first and second connector pieces adjacent its other end.

8. Hot-gas-conveying ducting as claimed in claim 7, having a plurality of said flame tubes disposed within said air casing, each of said flame tubes having an outlet end in the form of a segment of an annulus so as to form with the outlets of the other flame tubes substantially a continuous annular outlet, and having the second connector pieces extending only around the outer peripheral portions of the flame tubes.

9. Hot-gas-conveying ducting as claimed in claim 8, comprising sealing elements carried by the first connector pieces of the flame tubes, and co-operating sealing elements carried by the air casing structure to co-operate with said first-mentioned sealing elements to form air seals between the outlet ends of the flame tubes and the air casing structure.

10. Combustion equipment for a gas-turbine engine comprising a number of separate flame tubes arranged in a ring with their axes extending substantially lengthwise of the combustion equipment, an air casing wall surrounding the flame tubes, and means for mounting each of said flame tubes from said air casing wall with freedom for expansion of the flame tube outwardly from its centre and axially relative to said air casing wall while preventing substantial bodily displacement of the flame tube laterally with respect to the wall, including first flexible metal connector means secured to said flame tube at at least two positions on opposite sides of the periphery of said flame tube at a first location of said connector means, said flexible metal connector means having a second location spaced from said first location and said connector means being deformable so that said first and second locations are capable of relative movement with respect to each other at right angles to the flame tube axis, but being resistant to deformation in other senses, and a plurality of second flexible metal connector pieces each having a third location by which it is secured to said first connector means at said second location, and each second connector piece having a fourth location at which it is secured to said air casing wall, said second connector pieces being deformable so that said third and fourth locations are capable of relative movement with respect to each other axially of the flame tube, but being resistant to deformation in other senses, and said second connector pieces being spaced apart peripherally of the flame tube.

References Cited in the file of this patent

UNITED STATES PATENTS

| 2,348,833 | Miller | May 16, 1944 |
| 2,510,645 | McMahan | June 6, 1950 |
| 2,592,060 | Oulianoff | Apr. 8, 1952 |

FOREIGN PATENTS

| 277,612 | Germany | Aug. 24, 1914 |